United States Patent [19]
Haydon

[11] 3,916,277
[45] Oct. 28, 1975

[54] TIMING DEVICE
[75] Inventor: Arthur W. Haydon, Middlebury, Conn.
[73] Assignee: Tri-tech, Inc., Waterbury, Conn.
[22] Filed: June 30, 1969
[21] Appl. No.: 837,774

[52] U.S. Cl. ............... 318/310; 318/138; 318/329
[51] Int. Cl.² ................... H02K 27/20; H02P 5/00
[58] Field of Search .......... 318/310, 311, 312, 451, 318/46, 47, 329, 326–328, 128–132, 138; 310/24; 58/147; 331/35, 154, 156, 157

[56] References Cited
UNITED STATES PATENTS

| | | | |
|---|---|---|---|
| 1,907,531 | 5/1933 | Fitzgerald et al. | 318/310 |
| 2,898,537 | 8/1959 | Cluwen | 318/47 X |
| 3,161,813 | 12/1964 | De Wolf et al. | 318/129 X |
| 3,246,224 | 4/1966 | Helfner et al. | 318/310 X |
| 3,375,423 | 3/1968 | Mayer et al. | 318/132 X |

*Primary Examiner*—J. D. Miller
*Assistant Examiner*—Robert J. Hickey
*Attorney, Agent, or Firm*—Lee C. Robinson, Jr.

[57] ABSTRACT

A time base frequency source and motor speed control comprising a rotating permanently magnetized driving magnet which is loosely magnetically coupled to a balance wheel also permanently magnetized and mounted about an axis adjacent the driving magnet so as to oscillate at a predetermined natural frequency in response to rotation of the magnet. The device also includes a signal coil adjacent the balance wheel, for generating an electrical signal representative of the frequency of the oscillations of the balance wheel and means for controlling the speed of rotation of the driving magnet and for controlling other devices in accordance with such frequency.

15 Claims, 8 Drawing Figures

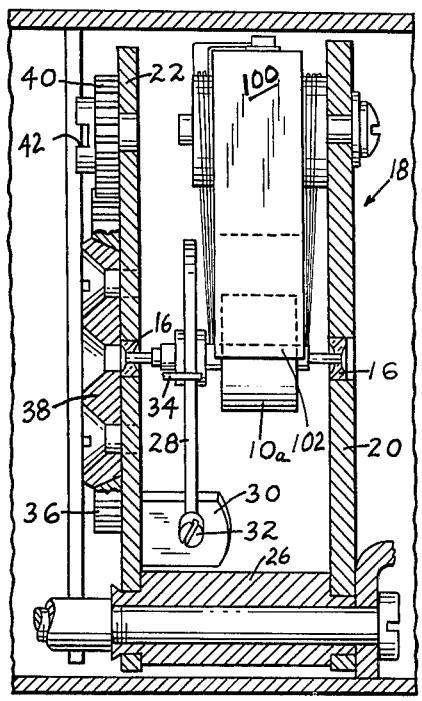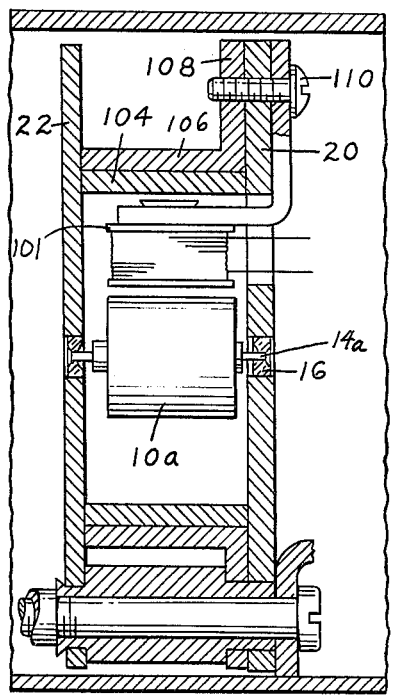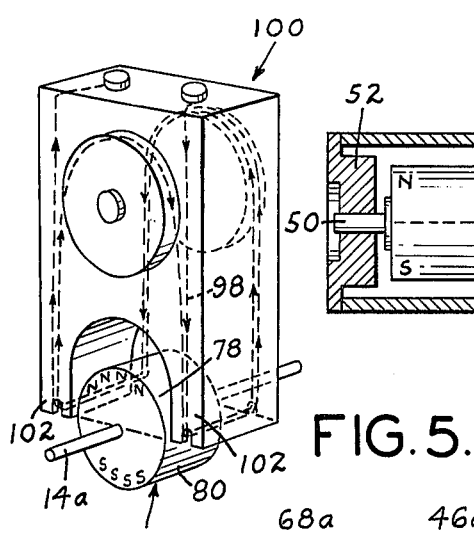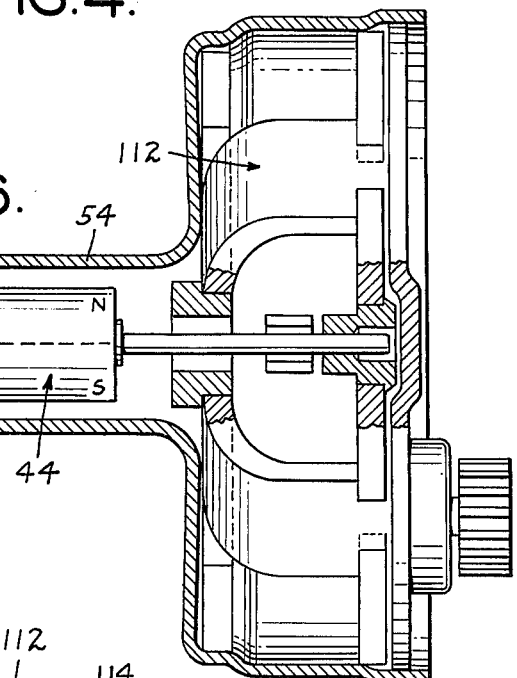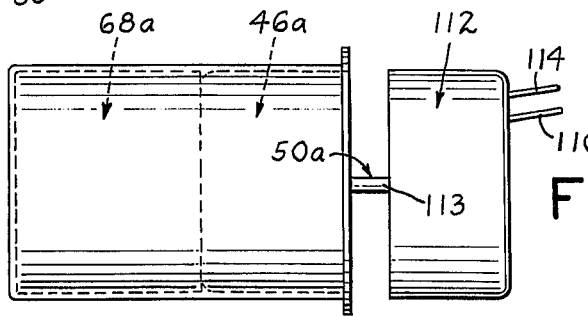

TIMING DEVICE

BACKGROUND OF THE INVENTION

This invention pertains to time base frequency sources and more particularly to those in which the mechanical oscillation of an element provides the time base for the source.

Many known frequency sources using the mechanical oscillation of an element as the time base are dependent upon a uniform voltage source for their accuracy or include voltage control circuitry to prevent overdriving of the oscillating element. Some of these sources are also subject to inaccuracies due to external vibrations and/or other causes. Other devices use the mechanical oscillation of an element as the source of control information but depend on a speed differential between the oscillating element and the driving portion of the device to create an error signal and have an accuracy of only ± 1–2%. These characteristics are not satisfactory for many precision timing applications where accuracy in the order of ± 1/10 of 1% or better are desired, particularly over a wide range of input voltages.

One object of the invention therefore is to provide a more accurate frequency source in which an oscillating element provides the time base.

Another object is to provide a frequency source of this type, the accuracy of which is not heavily dependent on such factors as a uniform voltage source, freedom from external vibrations or uniform ambient temperature, etc.

A further object is to provide a new and improved time base frequency source and motor speed control which is economical to manufacture, highly accurate, thoroughly reliable in operation, long lasting and which requires only a small amount of power to operate.

Other and additional objects and advantages of the invention will become apparent from the summary, drawings and detailed description thereof as well as from the appended claims.

BRIEF SUMMARY OF THE INVENTION

This invention comprises a device including a permanently magnetized driving member, means for rotating said member, a permanently magnetized balance member oscillatably mounted about its central axis adjacent the driving member so as to form a loose magnetic coupling therewith which causes said balance member to oscillate about said axis at a predetermined natural frequency in response to rotation of the driving member, and a feedback system for controlling the speed of the rotating means in accordance with the frequency of the oscillations of the balance member.

One feature of the invention is that a rotating magnet is used to energize a magnetic balance wheel into oscillations about its own axis of rotation. Preferably both the rotating magnet and the balance wheel are made of permanently magnetic material such as ferrite.

Another feature of the invention is that the rate of rotation of the rotating or driving magnet is controlled by one of the parameters of the oscillations; namely, their frequency which is stabilized by conventional means such as a temperature compensated hair spring or a permanently magnetized ring of material around the balance wheel. The hair spring or magnetic ring form part of a high Q circuit in which the balance wheel is finely tuned to oscillate at a precise predetermined natural frequency. In the preferred embodiment of the invention this frequency is 60Hz.

A further feature of the invention is that the oscillation frequency of the balance wheel also controls the amplitude of its oscillations. This is done by using the frequency to control the speed of rotation of the driving magnet and by using the rotation of this magnet to oscillate the balance wheel by means of a loose magnetic coupling between them. Since the frequency of the oscillations is constant, the speed of the driving magnet is constant. Since the balance wheel is energized by the constant speed rotating magnet, there is a limit to the rotational speed which can be imparted to the balance wheel and when this limit is reached the oscillations will settle down to a constant amplitude thus creating conditions conducive to timing accuracy. Though in the embodiments of the invention disclosed herein the motor for rotating the driving magnet comprises an electric rotating machine of the stepper motor type, virtually any type of rotational driving force such as for example, synchronous electric motors, internal combustion, steam, hydraulic or other types of engines, can be used providing their speed of rotation is frequency controlled.

In one embodiment disclosed herein this frequency control is provided by a feedback system using a direct current power source in combination with a phase shift oscillator having a natural frequency of oscillation. A two coil three wire stepper motor, comprising the means for rotating the driving member, is initially powered by the output of the oscillator. However, once the oscillations begin a pickup coil adjacent the balance member generates an electrical signal in accordance with their frequency which is higher than that of the oscillator. This higher frequency signal is then fed into the oscillator, overcomes its natural frequency and causes it to oscillate at the pickup coil signal frequency.

The magnetic coupling between the driving magnet and the balance wheel is kept as weak as possible consistent with being able to start and maintain oscillations so that disturbance of the simple harmonic motion of the balance wheel by magnetic forces from the driving magnet will be kept to a minimum. Losses of energy and errors in the device are kept to a minimum by mounting the balance member in jeweled bearings to reduce friction, by tuning the balance wheel and hair spring combination or balance wheel and magnetic ring combination, as the case may be, very finely to achieve a precise resonant frequency for the oscillator, and by placing the pickup coil in a high impedance circuit to reduce its power consumption. These losses all of which are relatively constant will thus be kept to a minimum. This helps ensure that the amplitude of the balance wheel oscillations will settle down to a constant level and thus produce a condition which is conducive to precision timing.

With this construction the device is insensitive to variations in the voltage supply of as much as ± 20%, and the frequency output of the device is accurate to within about 35 0.05%. Even this figure may be improved, for example, by adding a flywheel which is frictionally coupled to the motor shaft for minimizing any ripple in the speed of the driving rotor.

The frequency output of the device may be taken directly from the signal coil and amplified for use in control apparatus exterior to the device or it can be taken from the output of the oscillator or some other portion of the circuitry. In cases in which a sine wave output is required, the output may be taken from the signal coil, or the shaft of the motor rotating the driver member may be used to drive a generator device having a sine wave output, the frequency of which is controlled by the output speed of the driving motor. The mechanical output of the motor additionally comprises an excellent source of constant speed mechanical power. Thus the device of this invention comprises not only a time base frequency source, but a motor speed control device having a high degree of accuracy.

BRIEF DESCRIPTION OF THE DRAWINGS

FIG. 3 is a vertical elevation view of the balance member portion of FIG. 2 showing a different pickup coil structure than that shown in FIG. 1;

FIG. 4 is a vertical elevation view of a second embodiment of the balance member portion of the invention using a permanently magnetized ring magnet in the place of the hair spring;

FIG. 5 is a perspective view of the coil and balance member portions of the embodiment of FIG. 3 illustrating the manner in which the coil is wound;

FIG. 6 is a vertical cross-sectional view showing certain details of the rotor portion of the motor of the FIG. 1 embodiment illustrating the use of the rotor as the driving magnet;

FIG. 8 is a schematic diagram of a third embodiment of the invention in which the electrical output is obtained from a generator driven by the motor which rotates the driving magnet.

DETAILED DESCRIPTION

Figure 1:
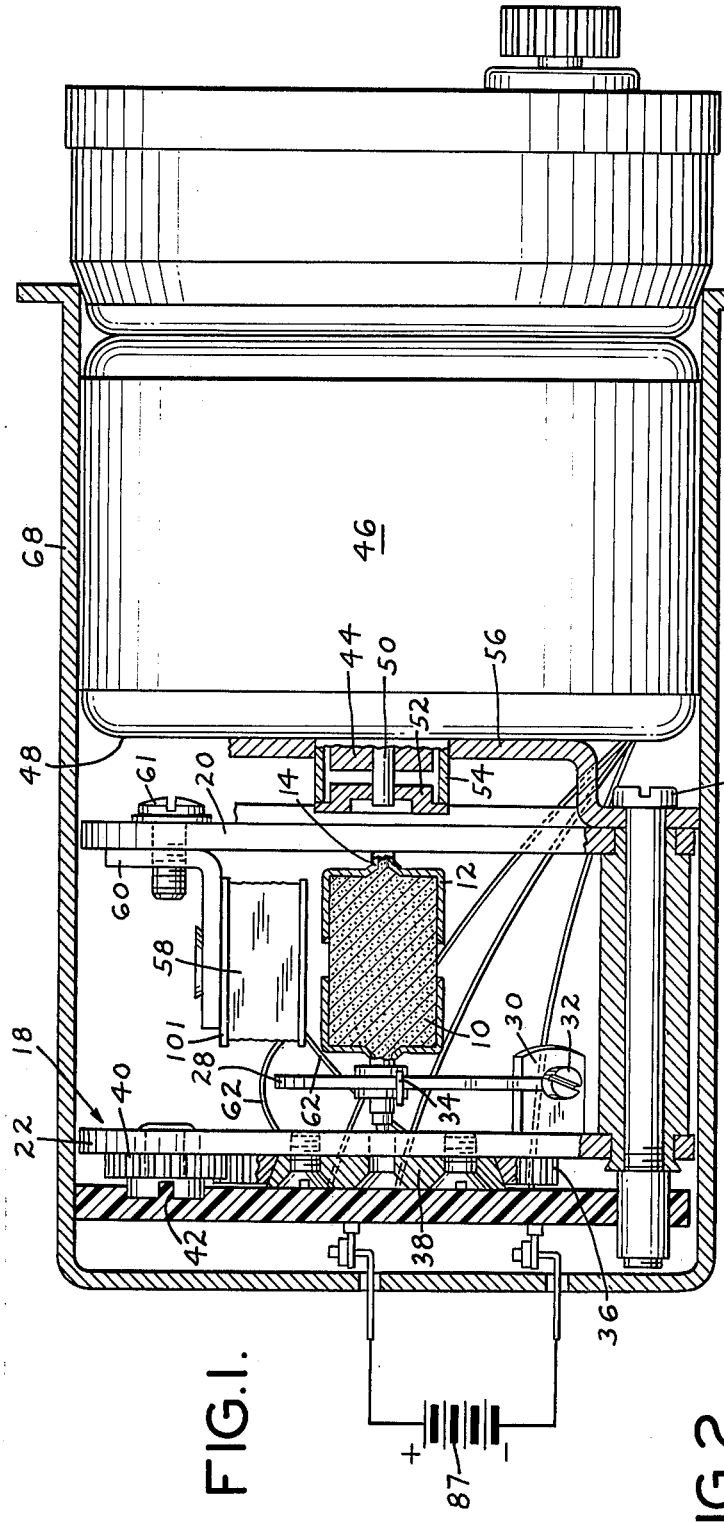
FIG. 1 is a vertical elevation view partially in cross-section of the preferred embodiment of the invention.
Figure 2:
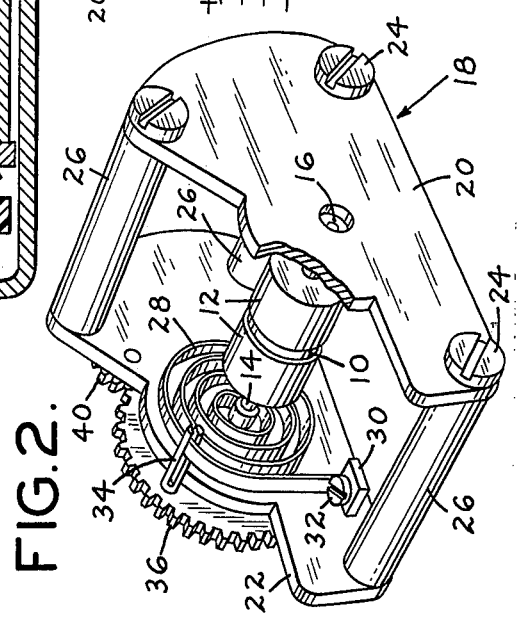
FIG. 2 is a perspective view of the balance member portion of the embodiment of FIG. 1 showing the temperature compensated hair spring.

Referring now to FIGS. 1, 2 and 6 of the drawings, the preferred embodiment of the invention comprises a permanently magnetized cylindrical ferrite balance wheel 10 mounted in a pair of copper cups 12 forming a shaft 14. At its opposite ends the shaft is mounted in jeweled bearings 16 which in turn are fixedly mounted in a non-magnetic housing 18 comprising plates 20 and 22 which carry the jeweled bearings 16. A plurality of screws 24 and spacing collars 26 which surround the screws keep plates 20 and 22 parallel to but a fixed distance apart from each other.

Mounted on the end of shaft 14 adjacent plate 22 is one end of a temperature compensated hair spring 28, known per se. The other end of the hair spring is fixedly mounted to a support 30 by a pin 32. Spaced a distance from support 30 and lightly gripping hair spring 28 is an adjustable clamp 34 mounted on a gear wheel 36 which is rotatable about a support 38 which is mounted coaxially with shaft 14. A pinion gear 40 having a screwdriver slot 42 meshes with gear 36 and completes the mechanism also known per se for adjusting the effective length of the hair spring so that it oscillates balance member 10 at a predetermined natural frequency when it is driven from its rest position. The position of adjustable clamp 34 on hair spring 28 is preferably set to cause the balance member to oscillate naturally at a frequency of precisely 60 Hz. By appropriately choosing the mass and dimensions of balance member 10 as well as the characteristics of hair spring 28 and the position of clamp 34 on the hair spring, in a conventional manner, the mechanical oscillator portion of the device may be tuned to resonate to other desired frequencies if 60Hz is not convenient. The result is a fine tuned mechanical oscillator with a Q rating of about 100, or more.

Referring now more particularly to FIGS. 1 and 6, the power for causing balance member 10 to oscillate comes from the permanently magnetic rotor 44 of a three wire electric stepper motor 46 such as is disclosed in my copending U.S. application Ser. No. 617,529, filed Feb. 21, 1967, now U.S. Pat. No. 3,495,113. The constructional details of the motor are not essential to the invention herein except that rotor 44 is mounted about a shaft 50 adjacent balance member 10 and is longer than that shown in my copending application. Thus one end of it extends slightly beyond the motor housing 48 as seen in FIG. 1. Adjacent the rotor portion which extends beyond housing 48 the end of shaft 50 is rotatably mounted in a non-magnetic bearing 52 which is preferably made of brass so as not to shield balance wheel 10 from the magnetic field of the rotor any more than necessary. Bearing 52 itself is supported in rotor housing 54 which is also made of non-magnetic material.

Rotor 44 comprises a two-pole cylindrical permanent magnet, diametrically opposing halves of which are oppositely magnetized (see FIG. 6). Thus, one-half of the rotor 44 is polarized with a magnetic north (N) pole on its periphery 74 and the opposite half is polarized with a south (S) pole on its periphery 76. As seen in FIG. 5 balance member 10 is similarly polarized with a magnetic north pole along its periphery 78 and a magnetic south pole on its opposite periphery 80. In a quiescent or non operating condition both the rotor 44 and the balance member 10 will be at rest. In this condition those portions of the balance member having one polarity lie opposite those portions of the rotor 44 of opposite polarity. In this way the rotor 44 and the balance member 10 are attracted toward each other so that when the former is rotated about its axis (see FIG. 6) the balance member 10 rotates with the rotor until the hair spring 28 overcomes the coupling force between them and starts the balance member oscillating.

Adjacent the plate 20 of the housing 18 is a centrally apertured shielding member 56 through which a portion of rotor housing 54 extends. The shielding member 56 is made of ferrous metal material so as to prevent as far as possible any electromagnetic radiation from the motor winding from reaching the pickup coil 58 or the balance wheel 10. The coil 58 preferably comprises about 3,000 turns of number 46 wire and is positioned adjacent the balance wheel 10 with a large portion of these turns parallel to the balance wheel shaft 14 so as to cut a maximum number of lines of magnetic force as the wheel oscillates. The coil is mounted on a bracket 60 which is affixed to the plate 20 by a screw 61 so as to facilitate generation of an electrical signal from the oscillations of the balance wheel. The coil 58 is connected directly to the input terminals 64 (FIG. 7) of the electronics portion 66 of the device.

Figure 7:
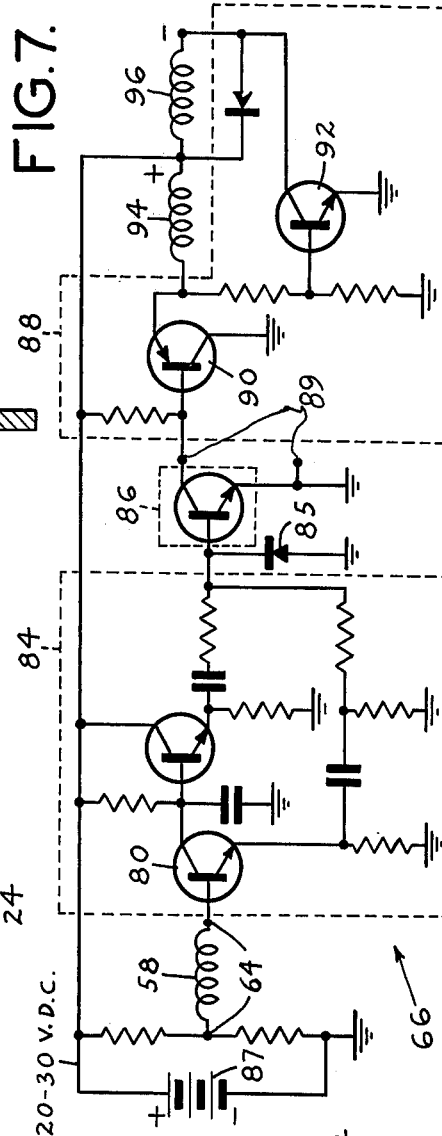
FIG. 7 is a schematic diagram of the electronic circuitry portion of the embodiment of FIG. 1.

Referring now more particularly to FIGS. 1 and 7, the electronics portion or circuit 66 comprises an oscillator 84, an amplifier 86 and a switching circuit 88. The oscillator 84 preferably comprises a transistorized phase shift oscillator including a plurality of frequency responsive resistance-capacitance (RC) networks for producing oscillations at a natural frequency of about 15 Hz. As is shown in FIG. 7 a direct current voltage source 87 of between about 20 and 30 volts is connected to the oscillator which produces a 15 Hz square wave signal. A diode 85 is connected to the oscillator and clamps the lower value of this signal to ground. The diode is also connected to the input of the amplifier 86 which amplifies the signal and delivers it to the switching circuit 88 connected to its output. Circuit 88 comprises a network including a pair of transistors 90, 92 which turn the power to each of the motor's two driving coils 94, 96 alternately on and off.

In operation the device is started by connecting the electronics portion across the 20 to 30 volt direct current power source. This causes the oscillator to generate a 15 Hz signal which is fed through the amplifier and switching circuit to the motor 46 causing it to rotate at about 900 rpm. As the motor begins to rotate the magnetic coupling between rotor 44 and balance wheel 10 causes the balance wheel to rotate away from its rest position until spring 28 overcomes the coupling force and starts the balance wheel oscillating. These oscillations occur at precisely 60 Hz because of the fine tuning of the hair spring 28 and induce a 60 Hz sine wave signal in pickup coil 58. This signal is then fed back into the oscillator where it overcomes the natural frequency of the circuit and causes it to oscillate at the frequency of the sine wave signal. This in turn speeds the motor up to a constant 3,600 rpm. If a 60 Hz. electrical output from the device is desired it can be taken off the output terminals 89 between the amplifier 86 and the switching circuit 88.

In the electronics portion 66 of the device, if desired the phase shift oscillator 84 which has been described may be replaced by a very high gain amplifier, such as an integrated circuit operational amplifier, thus eliminating the need for shielding member 56. In such a construction the electronic noise in the amplifier and other parts of the device creates a random output in the amplifier which is large enough to energize the motor sufficiently to get the balance member oscillating. As soon as this occurs the pickup coil 58 begins generating a 60 Hz sine wave signal which is fed into the amplifier, overcomes the noise and becomes the only significant factor controlling the speed of the motor. Due to the high gain of the operational amplifier, a lower signal level from the pickup coil may be used to operate the system.

Referring now to FIGS. 3 and 5, the pickup coil 58 is wound in a different configuration than in FIG. 1, namely, in a U shaped pattern 98 on a coil support 100 rather than on a spool 101 as in FIG. 1. With the balance member fitting between the legs 102 of the support and having the polarity shown, when the member rotates clockwise the current flows in the wire in the direction shown by the arrows in the pattern 98. Naturally it flows in the opposite direction when the balance member rotates counterclockwise.

It should be noted that, although in the FIGS. 1 and 2 embodiment the balance member 10 is mounted in copper cups 12, a different configuration 10a comprising a large diameter member mounted directly on a shaft 14a instead of using the copper cups is shown in FIGS. 3–5.

Referring now to FIG. 4, the second embodiment of the invention includes all the features of the preferred embodiment except that the balance member 10a is like that shown in FIGS. 3 and 5 and a permanently magnetized ferrite ring 104 is used in place of the hair spring 28 to tune the oscillations of the balance member to 60 Hz. Ring 104 preferably forms a cylinder which coaxially encircles the balance member 10a but is spaced radially outwardly from its periphery to accommodate the pickup coil 58 in the space between them. Ring 104 is mounted in a collar 106 having a flange portion 108 which is rigidly held in position adjacent plate 20 of housing 18 with one or more screws 110. The ring is polarized with its north and south poles aligned with the north and south poles of the motor rotor 44 when in its rest position. In this condition the south pole on the periphery of the balance member 10a will be attracted to and lie adjacent but spaced from the north pole of both the rotor 44 and the ring 104. Its north pole will likewise be attracted by the south poles of the rotor and ring. The magnetic flux effect on the ring 104 of the balance member 10a in this quiescent condition is greater than the flux effect of the rotor 44 on the member, but not so great as to prevent the rotor from driving the balance member into oscillation when the motor starts to run. The magnetic effect of the ring on the balance member is comparable to that of the hair spring, and the amplitude of oscillation is limited in a manner similar to that described herefofore so that the balance member is prevented from rotating continuously in one direction.

Referring now to FIG. 8 the third embodiment of the invention comprises the embodiment of FIG. 1 plus an electrical generator device 112 which is driven from an extension 113 of the shaft 50a of the motor 46a. The generator 112 has a pair of output leads 114, 116 for taking off the signal generated by the generator when driven by the motor. As mentioned earlier in this description, the speed of the motor is kept constant by the accurate 60 Hz frequency of the balance member so that the generator puts out an excellent sine wave.

It will be obvious to those skilled in the art that various modifications and alterations can be made to the disclosed embodiments without going beyond the scope of the invention. For example, ferrite is not the only satisfactory permanent magnetic material for the rotor, balance member and magnetic ring. Almost any high coercive force non-conductive permanent magnetic material having a comparable or greater energy product is also satisfactory. In addition it should be clear that though the balance member in all the embodiments is shown coaxial with the driving member that this preferred construction is not essential. Thus the balance member can be mounted above or below the driving member or at any one of a variety of angles with respect to it. The important aspect is to have sufficient coupling between these two members so that the balance member will begin oscillating when the rotor starts to revolve. Likewise, the driving member need not be mounted directly on the motor shaft but can be driven by the motor shaft through a train of one or more gears and shafts. Similarly, though the embodiment of FIGS. 1 and 6 show a reduction gear train 112 connected to the mechanical output end of the rotor shaft 50 such a train need not be incorporated in a device according to the invention. When the device is intended to produce a mechanical output it can be obtained either directly from the motor shaft or through a gear train which either increases or reduces the shaft revolutions. Further, other and additional modifications may occur to those skilled in the art.

What is claimed is:

1. A device comprising a stepper motor having a rotor which forms a permanently magnetized driving member, means for applying d.c. pulses to said stepper motor to rotate said member, a permanently magnetized balance member rotatably mounted about its central axis adjacent but spaced from said driving member and forming a magnetic coupling therewith which causes said balance member to tend to rotate about said axis in response to rotation of said driving member, means cooperating with said balance member for limiting the motion thereof so that said balance member oscillates at a predetermined natural frequency in response to rotation of said driving member, and a feedback system which controls the pulse applying means in accordance with the frequency of the oscillations of said balance member, said feedback system including means for generating an electrical signal in accordance with the oscillations of said balance member and means responsive to the frequency of said signal for controlling the rotation speed of said driving member.

2. A device according to claim 1 wherein at least one of said driving members and said balance member comprises ferrite material.

3. A device according to claim 1 wherein the means for limiting the motion of the balance member comprises spring means connected to said balance member.

4. A device according to claim 3 wherein said spring means comprises a temperature compensated hair spring and there are means for tuning said hair spring to oscillate said balance member at said predetermined natural frequency.

5. A device according to claim 1 wherein said driving member has a rotating shaft which provides a mechanical output the rotational speed of which is controlled by the frequency of the oscillations of said balance member.

6. A device according to claim 5 wherein there is a generator and the mechanical output of said shaft is coupled to said generator for generating an electrical output which comprises a constant frequency alternating current waveform.

7. A device according to claim 1 wherein there is an alternating current generator connected to said rotor for generating an alternating current waveform the frequency of which is controlled by the rate of rotation of said rotating means.

8. A device comprising a stepper motor having a rotor which forms a permanently magnetized driving member, means for applying d.c. pulses to said stepper motor to rotate said member, a permanently magnetized balance member rotatably mounted about its central axis adjacent but spaced from said driving member and forming a magnetic coupling therewith which causes said balance member to tend to rotate about said axis in response to rotation of said driving member, said driving member being mounted coaxially with said balance member, means cooperating with said balance member for limiting the motion thereof so that said balance member oscillates at a predetermined natural frequency in response to rotation of said driving member, and a feedback system which controls the pulse applying means in accordance with the frequency of the oscillations of said balance member, said feedback system including means for generating an electrical signal in accordance with the oscillations of said balance member and means responsive to the frequency of said signal for controlling the rotation speed of said driving member.

9. A time base frequency source including a permanently magnetized driving member, means for rotation said member about an axis, said rotating means comprising an electric motor having a rotating shaft and said driving member being fixedly coaxially mounted thereon, a permanently magnetized balance member mounted about its central axis adjacent said driving member and forming a magnetic coupling therewith, mounting means for said balance member including a shaft coaxial with the motor shaft and mounted in jeweled bearings, a temperature compensated hair spring one end of which is connected to said balance member and the other end of which is connected to an adjustable support to cause said balance member to oscillate about its central axis at a predetermined natural frequency in response to rotation of said driving member, a pickup coil adjacent said balance member for generating an electrical signal in accordance with the oscillations of said balance member, and means responsive to the frequency of said signal for applying pulses to said rotating means in accordance with said frequency, said frequency responsive means including a pair of output terminals for delivering a waveform having the frequency of said signal from said coil.

10. A time base frequency source according to claim 9 wherein means are provided for shielding the signal coil and balance member from electromagnetic radiation from said electric motor.

11. A time base frequency source according to claim 9 wherein said electric motor includes a rotor and said driving member comprises said rotor.

12. A time base frequency source comprising a stepper motor including a permanently magnetized driving member and means for rotating said member about an axis, a permanently magnetized balance member mounted about its central axis adjacent said driving member and forming a magnetic coupling therewith, a temperature compensated hair spring one end of which is connected to said balance member and the other end of which is connected to an adjustable support to cause said balance member to oscillate about its central axis at a predetermined natural frequency in response to rotation of said driving member, a pickup coil adjacent said balance member for generating an electrical signal in accordance with the oscillations of said balance member, and means responsive to the frequency of said signal for controlling the speed of said motor in accordance with said frequency, said frequency responsive means comprising a phase shift oscillator having a predetermined natural frequency of oscillation and adapted to pulse said motor at said predetermined frequency in the absence of said signal from said pickup coil and to oscillate at said signal frequency in response to receipt of said signal, said frequency responsive means including a pair of output terminals for delivering a waveform having the frequency of said signal from said coil.

13. A device comprising a permanently magnetized driving member, means for rotating said member, a permanently magnetized balance member rotatably mounted about its central axis adjacent but spaced from said driving member and forming a magnetic coupling therewith which causes said balance member to tend to rotate about said axis in response to rotation of said driving member, a permanently magnetized member mounted coaxially about said balance member to limit the motion thereof so that said balance member oscillates at a predetermined natural frequency in response to rotation of said driving member, said permanently magnetized member consisting of a ring of ferrite material, and a feedback system which controls the speed of the rotating means in accordance with the frequency of the oscillations of said balance member.

14. A device comprising a permanently magnetized driving member, means comprising an electric motor for rotating said member, a permanently magnetized balance member rotatably mounted about its central axis adjacent but spaced from said driving member and forming a magnetic coupling therewith which causes said balance member to tend to rotate about said axis in response to rotation of said driving member, magnetic means cooperating with said balance member for limiting the motion thereof so that said balance member oscillates at a predetermined natural frequency in response to rotation of said driving member, and a feedback system which controls the speed of the rotating means in accordance with the frequency of the oscillations of said balance member, said feedback system including means for generating an electrical signal in accordance with the oscillations of said balance member and means responsive to the frequency of said signal for controlling the rotation speed of said motor.

15. A device comprising a permanently magnetized driving member, means for rotating said member, a permanently magnetized balance member rotatably mounted about its central axis adjacent but spaced from said driving member and forming a magnetic coupling therewith which causes said balance member to tend to rotate about said axis in response to rotation of said driving member, a permanently magnetized member mounted coaxially about said balance member to limit the motion thereof so that said balance member oscillates at a predetermined natural frequency in response to rotation of said driving member, and a feedback system which controls the speed of the rotating means in accordance with the frequency of the oscillations of said balance member.

* * * * *